Feb. 7, 1967 D. SILVERMAN 3,303,491

INFORMATION HANDLING SYSTEM

Filed April 22, 1963 4 Sheets-Sheet 1

Daniel Silverman

INVENTOR.

Daniel Silverman

INVENTOR.

Daniel Silverman
INVENTOR.

Daniel Silverman
INVENTOR.

United States Patent Office 3,303,491
Patented Feb. 7, 1967

3,303,491

INFORMATION HANDLING SYSTEM

Daniel Silverman, 5969 S. Birmingham, Tulsa, Okla. 74100

Filed Apr. 22, 1963, Ser. No. 274,683
18 Claims. (Cl. 340—347)

This invention relates to the field of recording and handling of analog and digital information and the conversion of such information back and forth between analog and digital form. More specifically it relates to the use of analog records in nonreproducible form, in which the information is recorded as a curve whose departure from a longitudinal reference line is a function of the information recorded, and the scanning of such records by automatic or manual means to reproduce this analog information for later conversion to digital values. It also concerns the reverse process of conversion of digital information to analog form for recording in reproducible form and for display.

There are many instances where analog information is recorded nonreproducibly in the form of strip charts, pen records, or photographic traces which must be converted to digital form for mathematical operations in a digital computer. Examples of these records might be meterological records of some functions of the weather recorded vs. time, or geophysical records representing ground motion, electrical or other properties of the earth recorded as a function of time or position in the earth, such as electrical logs, seismic records, telemetered data from space vehicles, etc. With the advent of large fast digital computers, there is a growing use of these computers to analyze the analog records for information of a kind that cannot easily be derived by analog means. For example, simple electrical filtering of the analog signals is possible by conventional analog means, but there are many advanced filtering systems that can only be utilized by means of digital computers, and so on.

The modern high-speed digital computers are rather specialized devices as regards the mechanics of handling the signals. Thus they generally require that information be introduced into the computer in the form of magnetic marks or magnetized spots on a tape representing digitized values of the information. These magnetized spots must be in a very specific format, or else the machine will not be able to read them. If the digital information is not in the required format, it must be taken in simpler form, and by means of an accessory device converted into the proper format. Thus a punched paper tape with digital information can be converted to punched paper cards, and an accessory device can read these cards, convert the digital information into proper format and record it on magnetic tape, which tape can then serve as input to the computer.

Thus, there are three important steps in the conversion of analog signals on a nonreproducible record to computer input, namely (1) the conversion of the analog record to electrical analog signals, (2) the conversion of the analog signals to digital signals, and (3) the placing of the digital signals in proper format acceptable to the computer.

Means are available at the present time for (1) manually tracing an analog record, (2) converting the motion of the tracing stylus to analog electrical signals, (3) converting the analog electrical signals to a digital record—such as a punched paper tape, (4) converting the punched paper tape to punched cards, and (5) converting the information on the punched cards into digital tape of a particular format.

There are many disadvantages to this system. For example, since the manual tracing of the record is necessarily slow, the following steps (3), (4), and (5) are also slow. They also require expensive apparatus, which, being used at a slow information rate, provide a high cost per unit of information. Also each transcriber requires its own digitizer (3), and although steps (4) and (5) can be adapted to take the records from a number of digitizers (3), the steps (4) and (5), handling paper tape and cards, as they do, are inherently slow and expensive. Also this procedure and instrumentation offers little help for the reverse process of conversion of digital information from the computer to a final analog display.

In the system of my invention, I use a manual (or automatic) curve scanner, as above, but instead of going directly to a digitizer, step (3), I go to a temporary analog storage system. This is characterized as a reproducible recorder that is simple and cheap, which can record at any desired slow speed to accommodate to the slow speed of the manual scanning process, but which can be reproduced at high speed. The purpose of this temporary storage is to take the analog signals from (2) at low speed and reproduce them faithfully at high speed at a later time and place.

The reproduced analog signals will go to a high speed digitizer and format generator which can take the analog signals from the storage, convert them to digital values, arrange the proper format and record them on digital tape in format suitable for entry into a computer. Since the conversion from analog to digital values is done electrically, it is done at high speed, essentially the speed of the computer. Since it takes its input from a temporary storage record, any number of transcribers (1), (2) can be used to provide input records to this digitizer. Using well known means available on the market for storing analog signals in reproducible form, the digitizing and format generating can be done rapidly and cheaply. The temporary record can be by magnetic or photographic means.

There are commercial devices on the market that can be used for this digitizing and format generating, as is well known in the art. However, a specially effective system for digitizing and format generating is described in an application in the names of Daniel Silverman and C. F. Hadley, soon to be filed.

This same apparatus, namely, the intermediate storage and digitizer means, can also be used to convert digital signals derived from a computer to analog signals for reproducible recording and later utilization and display.

It is an important object of my invention to provide an improved system for converting information from analog, nonreproducible form into digital form for use in computers, and for converting digital information from computers into analog form for utilization as electrical signals or display, which is superior to the means now available for this purpose. More specifically, the object of this invention is to increase the fidelity by which these conversions are made, and to increase the speed and efficiency of these types of conversions. Another object related to the foregoing is to convert digital output from a high speed electronic computer into analog signals recoverable from a temporary analog reproducible storage record. Other objects include the reproducible recording of analog information in a manner providing high fidelity of playback and the treatment of digital information to permit reproducible recording in high fidelity.

In order to facilitate an understanding of these and other and further objects, and the principles of my invention, reference will be made to the several embodiments thereof illustrated in the accompanying drawings forming part of this application. Although specific language will be employed, it will nevertheless be understood that various further modifications of the devices illustrated herein, such as would fall within the province of those skilled in the art to construct, are contemplated as part of the present invention. In the drawings.

Figure 1:
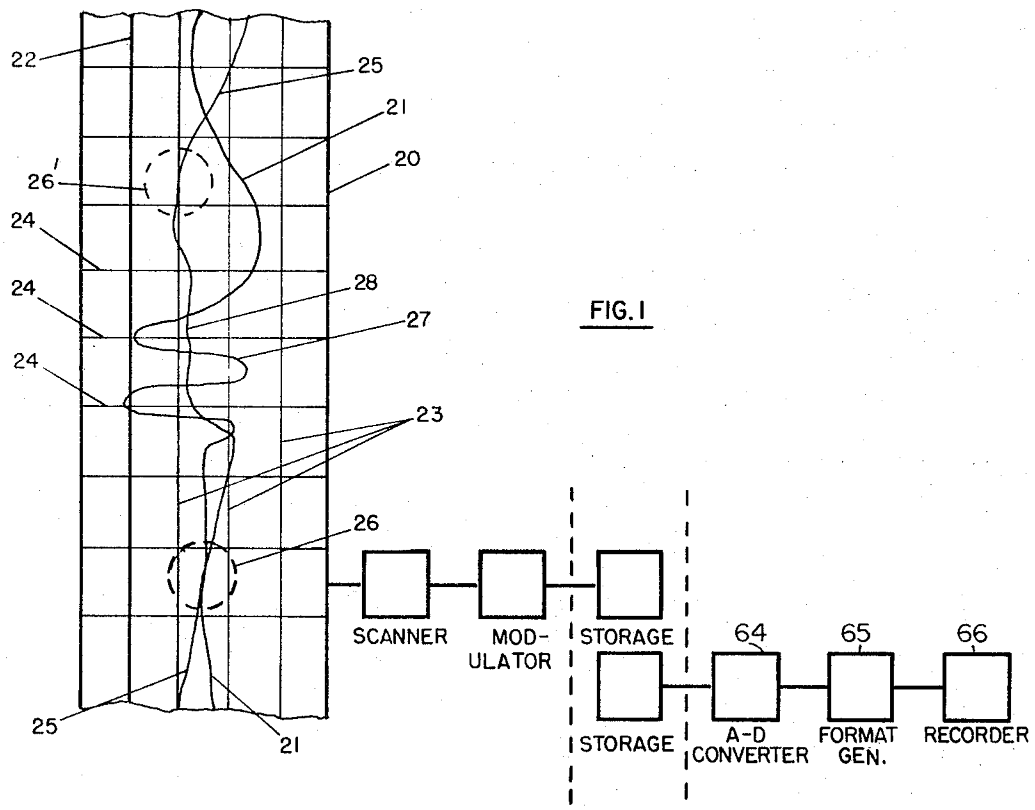
FIGURE 1 represents one type of analog record strip with schematic illustration of the other elements of my information system.

One of the most useful applications of my invention lies in the petroleum industry, and more particularly, in the conversion of logs to digital form and vice versa. Because of this important field of application, I will describe my invention relative to its use in this field, although there are many other areas of application, where all or part of the embodiments and processes taught in my invention can be utilized to advantage.

In the petroleum industry, geologists and geophysicists working together gather information from various sources from which they derive a picture of the structure and composition of the rocks that form the upper layers of the crust of the earth. This information is vital in determining where in the subsurface oil might accumulate. Part of this information comes from detailed examination of rocks on or near the surface of the earth, from physical or chemical measurements made at the surface of the earth, from rock samples drilled from the earth, and from measurements made in deep boreholes of the properties of the rocks through which the hole is drilled. These latter measurements are called logs and are generally represented, as in FIGURE 1, on a plastic or paper strip chart 20 on which a curve 21 is drawn, printed, or formed, such that the lateral departure of the curve from a longitudinal reference line 22 is the function being recorded. Generally lines 23 are drawn parallel to reference line 22 at predetermined spacings, which are called amplitude lines, from which the amplitude of the curve can be read at any point. The units of amplitude are those of the function being recorded, such as resistivity, self potential, magnetic susceptibility, salinity, etc. Generally the longitudinal dimension of the log is depth in feet. The depth lines 24 represent the depth of the logging instrument, below a reference elevation at the well, when the corresponding amplitude point of the curve was recorded. These log strips are recorded in the field, generally on photographic film, or by a pen recorder, as is well known in the art.

Since these logging measurements are often made to depths of 10,000 to 24,000 feet below the surface by instruments lowered on multiconductor cables in holes as small as 7 inches in diameter, it is difficult to make all of the physical, chemical, optical, acoustical, magnetic, gravity, thermal, etc., measurements one might like to make. Those measurements that can be made are then used in calculations to derive the values of other properties or parameters of the earth that are of great importance. Thus, for example, while the value of porosity of the rock in place is of paramount importance to the oil industry, no measurement has yet been made in a deep borehole to provide a direct measure of porosity. The best obtainable value of porosity is derived by calculations (based on theoretical analysis) from other properties that can be measured.

Such calculations of a secondary derived value $D_1$ (which might be, for example, porosity) based on primary property $P_1$ (which might be, for example, logged formation travel time in microseconds per foot) have been made manually by reading amplitudes of the curve $P_1$ at a given depth, calculating the value of $D_1$ and plotting this value on a new derived log of $D_1$. With increasing knowledge of the relations between $P_1$ and $D_1$, the increasing importance of the values of $D_1$, and the availability of large computers to make these calculations, there has been increasing interest in the reproducible recording of well logs. By recording the original logs of P in reproducible form, the steps of digitizing and calculating can be done very rapidly. As time goes on, more of the current logging will undoubtedly be done in reproducible form.

However, there are said to be several millions of logs in existence on wells drilled in the past, and all or most of these have potential geologic interest. The problem thus arises as to the best method of transcribing information in printed analog form and converting it to digital magnetic tape form. This is one of the problems to which this invention is directed.

Returning to FIGURE 1, I show a second log curve 25 representing a second property of the rocks. This curve 25 runs generally parallel to 21, and at times may cross curve 21. At the point 26, for example, it becomes difficult, even by eye, to separate the two curves to determine which is 21 and which is 25. The same difficulty arises at 26' where curve 25 intersects the amplitude line 23. This sort of situation illustrates the primary reason why automatic curve following instruments can not readily be applied to problem of scanning these logs. Much work is being done along these lines, although for the present, manual scanning or curve following is now universally employed. This is a relatively slow process, involving speeds of record traverse of 0.1 to 0.4 inch per second corresponding to 10 to 40 feet of logged depth per second. This, of course, depends on the character of the curve, being much slower when there are wide and rapid swings of the curve, as at 27, and much faster where the curve is of almost contsant amplitude as at 28. Thus it becomes desirable to make the log transcribing apparatus or scanner have variable speed of traverse, at the control of the scanning operator.

Shown in FIGURE 1 in schematic fashion are a group of boxes labelled scanner, modulator, storage, A–D converter, format generator, and recorder. The scanner is the means for tracing the recorded curve and producing an analog signal corresponding to the amplitude of the curve. This analog signal is combined with a carrier voltage in the modulator to form an amplitude modulated analog signal which is then recorded in the storage means. This can be a record on a magnetic or photographic or other type of reproducible storage means, such as a strip, tape, disc, or drum.

From the storage means, the reproduced amplitude modulated analog signal is converted to digital signals in the A–D converter. Here the analog signal is sampled at discrete time intervals, its instantaneous magnitude at each interval determined, and the binary numbers representative of this amplitude are recorded, all as is well known in the art.

Now, in the A–D converter the intervals of time at which the amplitude is sampled and the measurements are made can be determined from the signal itself, say at the times of peak amplitude, for example, or can be determined from a timing circuit or clock, as is well known, and is illustrated in connection with FIGURE 3. In the first case the modulated signal can be digitized directly by instructing the A–D converter to measure the signal voltage at the peak of the cycle, which represents the value of analog signal at that instant. Or the amplitude modulated signal can be demodulated, that is, detected and filtered, and the resultant analog signal can be digitized at predetermined discrete time intervals.

Figure 2:
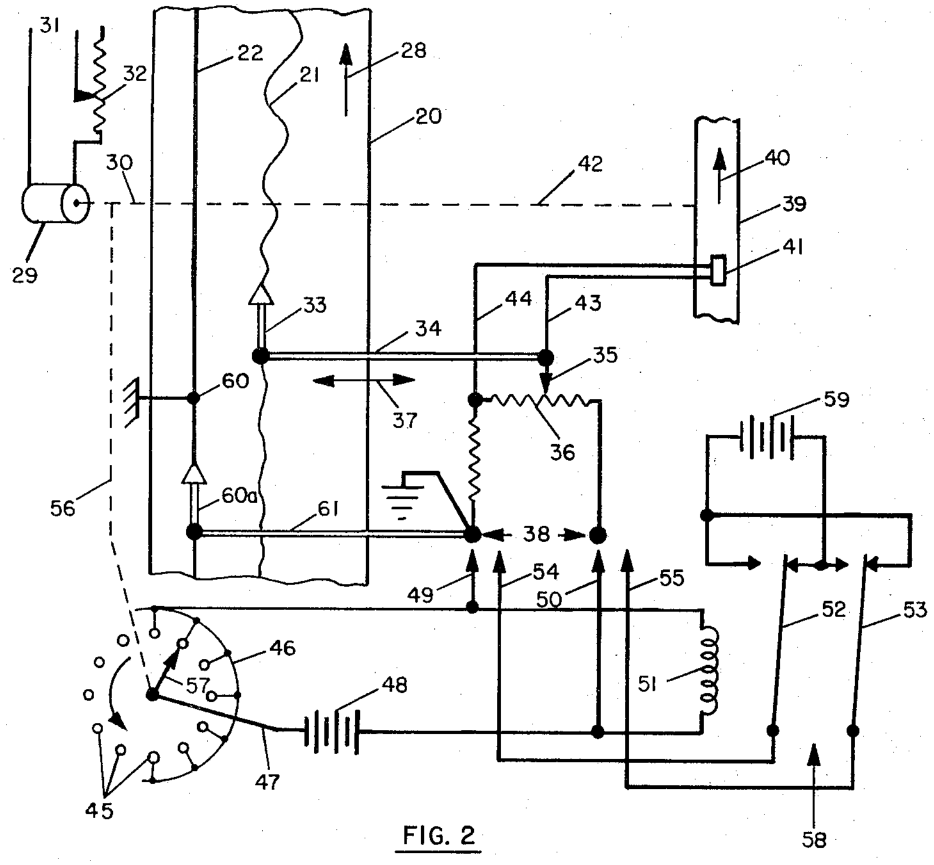
FIGURE 2 shows schematically the scanning device and temporary storage means which together constitute the transcribing part of my analog-to-digital conversion system.

The scanner and modulator can be of any type, although the system described in connection with FIGURE 2 is simple and effective. The subject of modulators and demodulators is old in the art and there are many textbooks on the subject. It is not felt to be necessary to describe this beyond what is already stated in the specification.

The storage means can be an analog magnetic tape recorder, or a photographic variable density or variable area recorder, which are well known in the art and need not be further described at this time.

The analog-to-digital converter (and the digital-to-analog converter discussed elsewhere) are common instruments in the digital recording and computer field. They involve electronic circuits which are controlled by internal or external timing pulses to sample the input signal, compare it to a binary controlled voltage, and to record that binary voltage which is equal to the sample.

The format generator is another piece of digital equipment normally forming a part of a digital computer system. It involves circuit elements, diodes, transistors, etc., connected in so-called "logic" networks. These are circuits which will make simple logical decisions, such as the decisions as to whether a given voltage is less than, equal to, or greater than another. It also involves storing and switching of signals. This art is well known in the digital computer field, in which there are many scientific and engineering journals, textbooks and catalogs. For example, information can be found in the following: Handbook of Automation and Control, three volumes, Thompson Ramo Wooldridge, Inc., Los Angeles, 1961; High Speed Computing Devices, McGraw-Hill, 1950; Switching Circuits with Computer Applications, W. S. Humphrey, Jr., McGraw-Hill, 1958; Transistor Logic Circuits, R. B. Hurley, Wiley, 1961; Digital Computer Components and Circuits, R. K. Richards, Van Nostrand, 1958. Also, the publications and catalogs of the several computer manufacturers such as the International Business Machines Company, New York, N.Y., General Electric Company, Schenectady, N.Y., Control Data Corporation, Minneapolis, Minnesota, and others will show details of these various devices. Also, the patent of R. S. Foote, et al., U.S. No. 3,134,957, entitled "Method of and Apparatus for Obtaining Seismic Data," illustrates the construction and use of these devices. In view of this volume of available information, it is not felt necessary to discuss the details of these devices further.

Referring to FIGURE 2, I show the same log strip 20, curve 21, and reference line 22. This log strip 20 is traversed in the direction of the arrow 28 by motor 29, and drive shown schematically as 30. The motor is driven from power supplied to its leads at 31, and speed controlled by rheostat 32. A pointer 33 is controlled by a handle 34 so as to continually follow the curve 21 as the strip advances. The handle 34 moving in the direction 37 also controls the slider 35 on a potentiometer 36. The potentiometer 36 is supplied from voltage source 38. Thus the leads 43 and 44 provide a voltage which varies as a function of the amplitude of curve 21. This voltage is the recovered analog electrical signal related to the analog signal recorded originally on log strip 20.

The next step in the utilization of this log information is to convert it to digital form suitable for entry into a computer. In this connection, because of the large number of data points, which may be from 10,000 to 20,000 points per trace, and the complexity of the calculation, large digital machines are used. These are rapid and expensive and in the interest of cost require that the input information be provided in the form of digital magnetic tape of the exact format used in the computer. Thus we have on the one hand a slowly varying analog electrical signal at the output of the scanner, and on the other hand a high speed special format digital magnetic tape at the input to the computer. How best to get from one to the other, and back again, is the problem to which this invention is directed.

Commercial digitizing devices are generally of two classes—those of the electromechanical type such as the key punch and paper tape devices, which are relatively slow in operation, and the electronic analog-digital converters which are of high speed. For example, the paper tape machines may record at typical speeds of 20 to 50 characters per second, where each character may contain up to 8 bits. On the other hand, the electronic digitizers can convert from 10,000 to 50,000 characters per second, each of up to 12 bits each. Of course, the electronic digitizers are more expensive than the electromechanical devices, but the cost per bit converted is less, by far, for the electronic than for the electromechanical. In spite of its efficiency, the electronic digitizer cannot be used effectively to directly convert the analog log signals from the scanner because they vary so slowly. Thus to be effective, there must be an intermediate temporary storage between the scanner output and the electronic digitizer input.

Of course, the slow electromechanical digitizers can be used directly with the manual scanner. Both are slow speed, and can work well together. However, the steps of converting the digital paper tape to digital magnetic tape is also a slow, expensive and cumbersome one. It involves converting the paper tape record to paper cards and, using a small satellite computer, to read the cards and convert the digital information into proper format on magnetic tape. Although this satellite computer can manipulate the bit information rapidly, the input to this machine coming as it does from a paper digital record must be entered relatively slowly into the device. In effect, the digital paper tape is an intermediate storage between the scanner and the computer. However, there are particular advantages to the intermediate analog storage (as will be made clear as the description progresses) particularly in the ability of the analog storage to take input at low speed and provide output at high speed. The analog storage can be either magnetic or photographic, as is well known in the art.

There are many advantages to the use of a temporary storage comprising a reproducible analog recording device, such as a magnetic or photographic recorder. Since the magnetic recorders are so common and so convenient, my embodiments will be described in terms of such a recording system. All that is required at the scanner is a recording head and transport means for the magnetic medium. No digitizing equipment is required at the scanner, as would be required with a punched paper tape storage. Furthermore, there is essentially no practical limit to the speed of recording or playback, as there is with electromechanical equipment. As a matter of fact, such electromechanical devices are designed for rather specific speeds of operation, and increasingly high speeds require increasingly complicated and expensive devices.

Furthermore, by modulating a constant frequency carrier signal by the analog function, a depth or time record is incorporated into the signal and is carried throughout the process to the final step of digitization. This modulation also improves the fidelity of the recording, and permits recording of and playback of a wide range of frequencies, down to D.C. At the playback step from the magnetic record to the digitization equipment, there is no practical limit to the speed of playback and digitization. Thus, the high speed capabilities of the electronic digitizers can be fully taken advantage of, speeding up the process and reducing the unit cost of the conversions.

Not only is the intermediate analog storage important in the analog to digital conversion step, but it is also important in the reverse, or digital to analog conversion.

Whereas the digital storage means can be used in the first process, because there are many simple slow analog to digital converters on the market that can be used to convert the analog signals and record them digitally, it is practically out of the question to use digital storage in the reverse digital to analog conversion. One reason for this, of course, is the scarcity of suitable slow, cheap, and convenient digital to analog converters.

In many of the high speed digital instruments in use at the present time, such as the high speed electronic computer, the big problem is the getting of information into and out of the device. The speed at which data are handled inside of the machine is far greater than the speeds of entry and exit. Thus, the problem of display of digital information is also very important, and this feature is an important part of my digital to analog conversion system. Here, my analog to digital converter previously used in the input process, can be used also for digital to analog conversion. The electronic circuitry is substantially as fast as the computer itself, and what is required is an intermediate storage between the converter and the ultimate display. Thus, the same intermediate storage used before now becomes available for this purpose. Here again the capabilities of the analog magnetic storage system to record and playback at widely different speeds is advantageous, and this property is improved by the step of modulating the analog signal. Thus the digital signal is first modulated in digital form, converted to a modulated analog signal in the D–A converter, recorded in modulated analog form, and later played back, demodulated and displayed. It is therefore quite evident, that, of the various alternative methods of providing intermediate temporary storage, the method using modulated analog storage is the most convenient and efficient, for conversion both from analog to digital as well as digital to analog signals.

Returning again to FIGURE 2, I show the leads 43, 44 connected to a magnetic recording head 41 recording an analog trace on magnetizable strip 39, moving in the direction of the arrow 40. This movement is controlled by motor 29 through drive 42. The speed of strip 39 need not be the same as for the log strip 20, but it should be proportional to it, so that a unit length of strip 39 will represent the same (depth) interval of curve 21 as will an equivalent length of log strip 20.

A reproducible photographic storage record can be made by well known means such as a variable area or variable density photographic trace. Since in playback, the photographic record provides an output proportional to the "amplitude" of the trace, that is, area or density, the photographic record can provide all frequencies, inclduing D.C. The magnetic recorder (as conventionally used) is a rate of change device in playback, and so has low sensitivity for low frequencies. Since some of the analog functions to be scanned contain D.C., I prefer to have the analog signal modulate a carrier signal. This does two things. It provides (1) easy playback of all frequencies of analog signal, (2) playback in high fidelity, and (3) a time or depth record.

In FIGURE 2, I show a third drive 56 from motor 29 to a rotating switch or contactor arm 57 which travels over a series of contacts 45 connected together by lead 46. The space between contacts 45 is such that the arm 57 breaks the circuit completely between the contacts it makes. The arm 57 is connected by lead 47 to battery 48. The output leads 49, 50, thus carry a square wave of voltage, of constant polarity, of the magnitude of battery 48 voltage and interrupted at a rate proportional to the speed of motor 29 and thus of strip 20. Each interruption then represents a unit of depth, or other longitudinal dimension of the log strip 20. This pulsed voltage source 49, 50, can then be used in place of the source 38 as signal to the potentiometer. The signal then recorded by head 41 will be an amplitude modulated signal which can be simply recorded and has special properties as regards playback of the magnetic record.

The pulsed voltage on leads 49, 50, can also go to a vibrator contactor 58 whose drive coil 51 is driven by the pulsed D.C. current, and whose two vibrating contactors 52, 53, in conjunction with battery 59 provide an A.C. signal of constant amplitude and constantly reversing polarity to leads 54 and 55 which can be substituted for source voltage 38. Here again the rate of reversal of voltage 54, 55, is directly related to the depth scale of the log. After modulation by the potentiometer 36, the signal to recording head 41 is an amplitude modulated analog signal.

The magnetic recording means 41 and recording medium 39 can be simple. Thus the magnetic track can be "direct recording" in which with an A.C. bias signal can record amplitude modulated signals. The amplitude modulated analog signal on this record can be played back with high fidelity, even for very low frequency signals.

In measuring the departure of curve 21 from the reference line 22, it is necessary to see that the line 22 stays under the index 60 as the log strip is traversed, or the reference line 22 must be scanned by a second stylus system **60*a*, with handle 61, which also controls the position of the potentiometer 36. Thus, the strip 20 can move from side to side, and so long as the indexes 33 and 60*a* stay on their same points, there will be no relative movement of the slider 35 with respect to the potentiometer 36**.

In FIGURE 2, the voltage between lines 43, 44, is dependent upon the position of the slider 35 on the potentiometer resistance element 36. This voltage is always unidirectional if a unidirectional voltage is supplied at terminals 38. However, it can go to zero value when the slider contact 35 reaches the end of the resistance 36. It is preferable to limit the motion of the index 35 and arm 34 so that the contact never reaches the end of the potentiometer. Thus, the output voltage on lines 43, 44, is unidirectional and greater than zero. Now, when the alternating D.-C. voltage 54, 55, is applied to the potentiometer terminals, the output 43, 44, will show a series of voltage segments positive and negative, and the times of the voltage reversals can be definitely determined.

Figure 3:
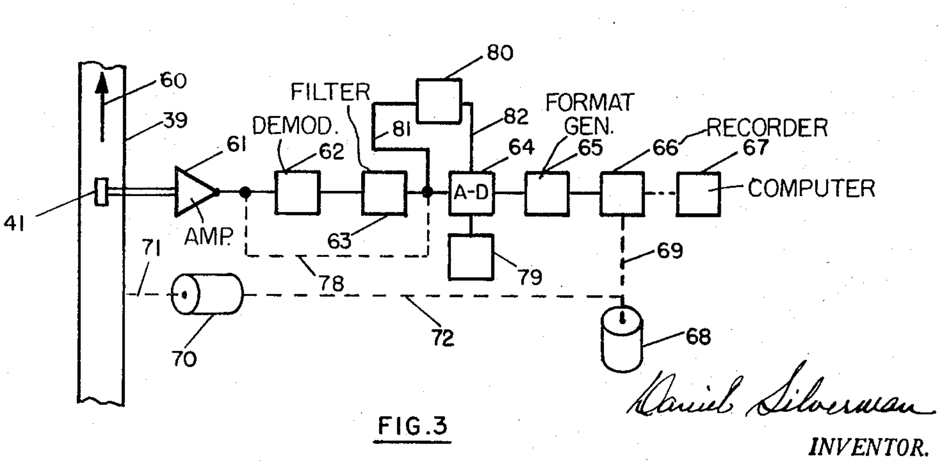
FIGURE 3 represents schematically the temporary storage and digital apparatus which together constitute the digitizing part of my analog-to-digital conversion system.

In FIGURE 3, I show the magnetized strip 39 moving in the direction of the arrow 60. Magnetic pickup head 41 is connected to amplifier 61; to demodulator 62, and to filter 63. Thus the amplitude modulated analog signal on strip 39 becomes, at the output of the filter 63, a simple analog electrical signal. This can then go to a high speed analog to digital converter 64, format generator 65, and magnetic digital recorder 66, whose digital magnetic tape output is compatible with the computer 67 into which the tape is to be fed.

The analog to digital converter 64 is a commercial device, many forms of which are on the market. They operate at very high speed to sample an input voltage at the command of a "read signal." This sample is held while it is measured in terms of reference voltages according to binary combinations. In this way the analog voltage is converted to digital values. The command to sample can be generated from an internal timing source or from an external source.

The magnetic tape recorder 66 has a motor 68 and drive 69 that drives the tape at constant speed. Also, in the A–D converter 64 there is a precise timing element 79 that controls the times at which the amplitude of the analog signal is sampled. Similarly, the magnetic strip 39 is driven by motor 70 and drive 71. This motor also must be constant speed, so that a given interval on strip 39 will correspond to a fixed interval of depth of the log, and the corresponding samples of digital information on the tape in 66 will likewise correspond to the same intervals of depth.

If desired, the two drives can be joined by the drive element 72 to tie together, in constant ratio, the strip 39 and the digital tape of 66. Again, if the precise timing source 79 is used to control the sampling, the speeds of the strip and tape must be synchronous with respect to 79. On the other hand, if a drive and timer similar to 56, 57, of FIGURE 2, is used on drive 70, 72, 68, and if signals similar to the signals on leads 46, 47, are used to control the sampling time, then the internal timing source 79 can be dispensed with, and the digital samples will correspond to specific depths on the log.

Figure 4:
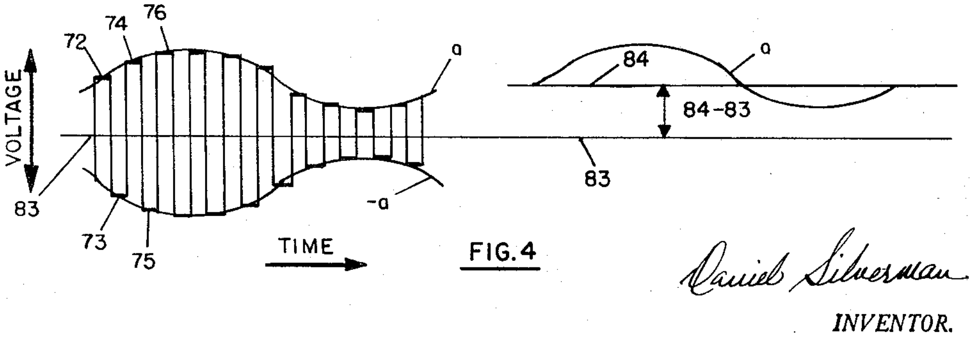
FIGURE 4 illustrates the type of modulation of the analog signal which I use.

In FIGURE 4, I show an amplitude modulated analog signal plotted as a voltage vs. time. The envelope of the modulation *a*, —*a*, represents the analog function. The alternating carrier signal 72, 73, 74, 75, 76, etc., has its positive peaks on curve *a*, and its negative peaks on curve —*a*. The frequency of reversal is a function of the speed of switch arm 57 of FIGURE 2. Thus each reversal corresponds to a fixed interval of depth, say *x* feet.

In the playback step of FIGURE 3, we can by-pass the demodulator 62 and filter 63, and go directly into the digitizer 64, as shown by the alternate connection 78. Now, if the sampling step is timed to occur at the positive and negative peaks, and if all the negative digitized values are reversed in sign, the digital output of 64 will correspond to the true analog function "*a*," about the zero or reference line 83. This can easily be corrected to the reference line 84 by the addition of digital values corresponding to the potential 84–83 to the recorded digitized values of function "*a*."

Figures 5, 5A, 5B, 5C, 5D:
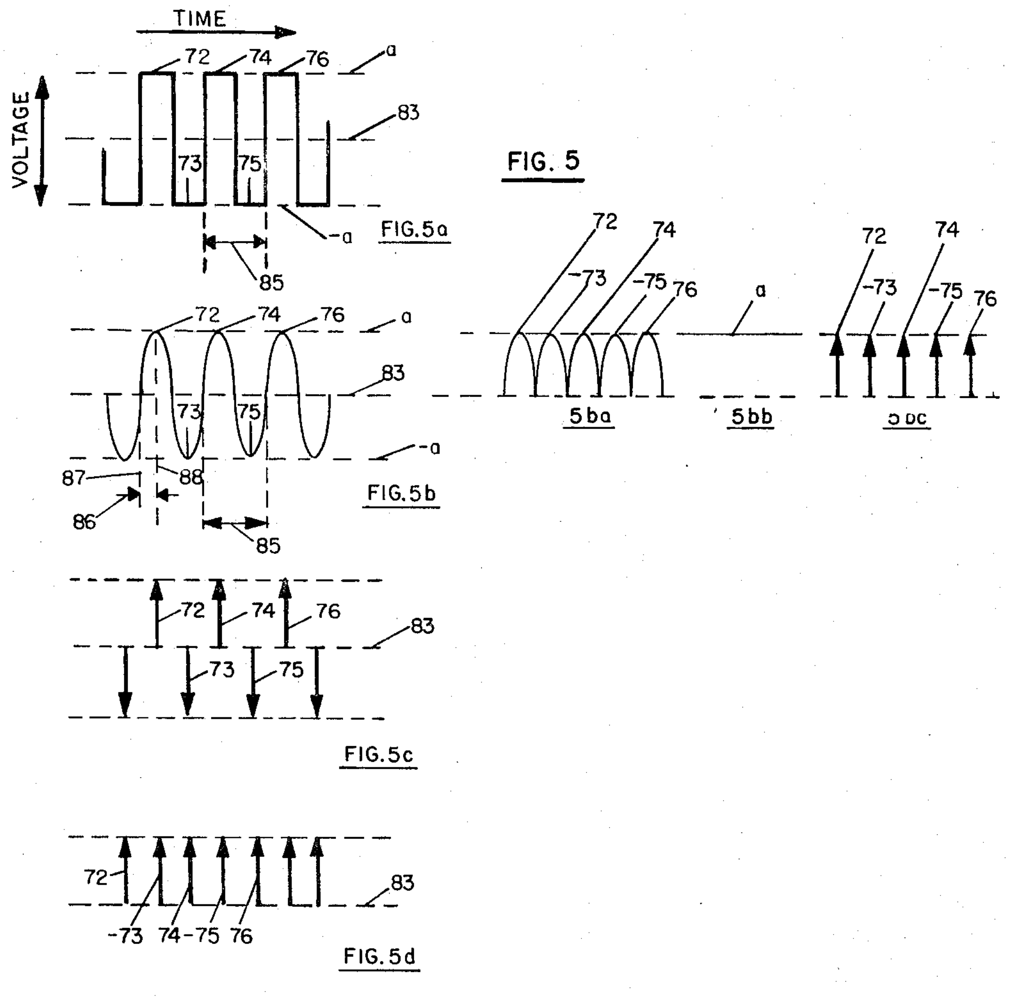
FIGURE 5 represents the successive forms of the signal as it passes through my analog-to-digital conversion system.

This is illustrated in FIGURE 5. Here a simple function "*a*" has been used, namely a constant D.C. value. This represents the amplitude of the curve 21 of FIGURE 2 or the position of slide 35 on potentiometer 36, which, in this illustration, is constant. After modulation by the drive 56, 57, and modulator 58, the voltage output of potentiometer 35, 36, will be represented by FIGURE *5a*. The amplitude *a*, —*a* of the voltage is a function of the amplitude of the curve 21. The rate of repetition of the voltage, or the period 85, is a function of the depth scale of the log. Thus each period represents a definite depth interval, and the integral of a number of such intervals represents the depth of that point on the log. This is an amplitude modulated signal, in which a carrier (represented by the signal of period 85) is modulated in amplitude by the function "*a*." This is the signal that is applied to the recording head 41.

FIGURE *5b* shows this same signal after playback by head 41 in FIGURE 3. This signal will look more like a sine wave than the square wave of FIGURE *5a* due to the loss of very high frequencies in the transcription process. This signal has the same period 85 and represents the output of amplifier 61. Now this signal can be demodulated or detected (rectified) in 62 to produce the signal in FIGURE *5ba*, in which the polarity of negative peaks 73, 75, etc., have been reversed. Then after passing through filter 63, the original function "*a*" shown in FIGURE *5bb* is recovered, and can be sent to the A–D converter 64 to provide the digital values of FIGURE *5bc*.

However, the signal of FIGURE *5b* can be sent directly to the A–D converter by way of bypass connection 78. Now, to ensure that digitization of this signal will occur only at the peaks of the function 72, 73, 74, 75, etc., we derive the command to sample the function, from the function itself. For example, by means well known in the art we can determine the time 87 of crossing of the zero line 83. We want to sample at the time 88 of the peak. So we measure time 87, introduce a delay 86 of proper magnitude and the sample will be taken at peak value 72, etc., and we get the digital values represented by the arrows 72, 73, 74, etc., of FIGURE *5c*. This is accomplished by the unit 80 of FIGURE 3, taking signal by leads 81 and delivering timing commands by leads 82 to the A–D converter.

By reversing the sign of the negative digital values in FIGURE *5c*, we get the digitized values of FIGURE *5d*, which are the same as the digitized values shown in FIGURE *5bc*. It will be clear, that equal digitized values can be added to those shown in FIGURE *5d* and *5bc* to shift the function "*a*" to any desired base or zero reference value. The reasons for going through the processes illustrated in FIGURES 2 and 5 are severalfold.

(1) The magnetic tape intermediate storage system 41, 39, always operates with an A.C. signal whatever the nature of the function "*a*."

(2) By the modulation process the output of the intermediate storage means can have an improved phase and amplitude characteristic over what would be possible by conventional direct recording.

(3) The period of this carrier signal is a function of the depth scale and thus carries the depth parameter throughout the various conversions.

(4) Following through the process of FIGURES *5a*, *5b*, *5c*, *5d*, we get the further advantage that the precise speed control of drivers 70, 68, and timer 79 are not required, although 70 and 68 must be tied together, such as by drive 72.

After digitization in A–D converter 64, FIGURE 3, the digitized values of the function "*a*" represented by groups of bits are reformed into a pattern or format suitable for entry into a computer by the format generator 65. These formatted signals then go to the magnetic digital tape recorder 66 that prepares tape on reels for installation on the tape readers of the computer 67. The internal details of the format generating unit 65 does not of itself form a part of this invention. There are a number of such devices well known in the art that can be used in this application. One such device particularly adapted to this invention is described in a U.S. patent application with C. F. Hadley, soon to be filed.

The important thing is that where the generation of the signal "*a*" is a slow process due to manual operation, or for other reasons, it is uneconomic and impractical to use a digitizer at that point that incorporates all of the functions of the units 64, 65, and 66, which are best incorporated into a very high speed system. On the other hand, the simple temporary storage system 39, 41, is cheap and convenient, and the tapes 39 which are produced can be collected over a period of time, from one or many transcribing devices, to provide a sufficient volume of input data to make economic the use of the high speed digitizer and format generator such as 64, 65, 66.

The switch 57 that provides the modulation in FIGURE 2 can be a simple sliding contact device as shown, or can be much improved by the use of a photoelectric timing disc and appropriate relays, electronic switching tubes or solid state devices, as are well known in the art.

In general, the intervals at which digital values will be required will generally be smaller than the intervals (between depth lines) marked on the logs. This will require that the photoelectric timing disc have more spots or lines to initiate switching operations, than are present on the log. On the other hand, due to possible stretch of the log strip, or slippage of the drive, it is important that the timing signals from the disc are in synchronism with the passage of depth lines past the scanning head. Thus it will be desirable to have a photoelectric or similar scanner to detect the passage of depth lines. This is shown schematically in FIGURE 6 by the lamp 89 and photocell 90. The drive motor that drives the strip 20 also drives a photoelectric disc mask 94 through drive 56 and clutch 93. The clutch is used, in conjunction with the control box 92 and lead 91 to synchronize the disc 94 with the signal generated by 90 due to the passage of the depth lines *24a*, *24b*, etc. By means not shown, but well known in the art, the disc is reset to a starting point each time the depth line signal is received from 90. Then the disc 94 turns in cooperation with the strip 20, to put out electrical signals to the chopper coil 51 or other type of modulator. The disc 94 has a number of lines or spots 95, 96, etc., which in cooperation with lamp 97 and photocell 98 generate the required pulses. The number of lines 95, 96, etc., on the disc are appropriate to the number of divisions of the marked depth intervals on the log desired.

Another way to provide this synchronization is to use a multiplicity of discs 94, 99, 100, etc., with appropriate photocell systems (or one large disc, etc., or other electronic timing system) to provide a multiplicity of sets of timing signals all synchronized with each other, and with the drive 56, but each set slightly out of phase with the others. If there are enough of these, there will always be one close enough in-phase with the signal from 90, to serve as timing master for the succeeding depth interval on the log. Thus a lead 104 going from the photocell 90 to each of a multiplicity of coincidence circuits 101, 102, 103, etc., will pick that one disc which at that time is most closely in coincidence with the signal on lead 104. This disc will then be connected to the switching device by means not shown until the next pulse on line 104 selects a new disc, etc.

I have shown how it is possible to scan an analog strip record, convert the mechanical displacements of the curve to electrical analog signals, modulate these signals and record them in temporary form for later playback to a fast analog digital converter and format generator to provide a digital magnetic tape compatible with high speed digital computers. I have illustrated the problem in terms of logs as used in the petroleum industry, because this is a particularly difficult problem to handle in view of the wide frequency range of the analog signals, which may vary from D.C. to high frequencies. However, this invention is by no means limited to log records, but can be used with any other time functions such as seismic or earthquake records, communication signals, etc.

After these analog signals are digitized and entered into the computer, calculations of many kinds are carried out to provide new parameters which must be displayed as functions of depth or time, the same as the original curve. Thus, there is a complete Digital-Analog-Display process that must be mechanized to fully utilize these data. Such a system is also part of my invention and utilizes many of the components and processes previously described in connection with the analog to digital conversion process.

In this display process, digital signals such as those of FIGURE *5bc* are provided by the computation process. These may represent, for example, values at each interval of *x* feet of depth, of a well parameter "*a*." These digitized values can be presented to a digital to analog converter to recover the function "*a*," and to display it by conventional means such as cathode ray tube, oscillograph, pen recorder, etc. However, some of these display devices are slow speed, and it becomes uneconomic to tie a potentially high speed expensive machine to a slow speed display device. Also, it is very often desirable, as in the case of logs, seismic records, etc., to display many functions side by side on a display sheet. This generally calls for some intermediate storage between the D–A converter and the display device. The same intermediate temporary storage system described above in the digitizing process thus becomes useful to accept analog information at high speed from the D–A converter, and to deliver it at lower speed to the display devices. Here again, for the advantages mentioned above, I prefer to use a modulated carrier system of intermediate recording for greater signal fidelity and for simpler and more positive timing control.

Figure 8:
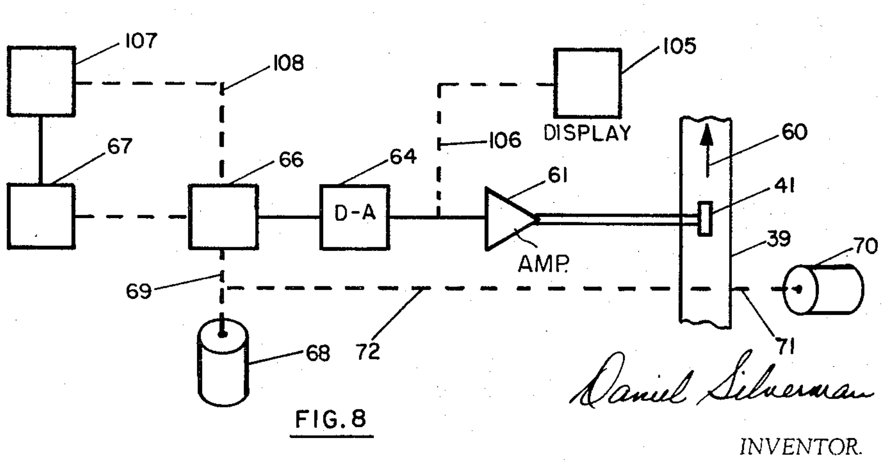

In FIGURE 8, I show a block diagram of this playback system. Block 67 is the computer that prepares the digital tape, that can be transferred to the tape machine 66, which will play back a digital signal to the D–A converter 64. This can provide an analog signal that can go directly by route 106 to the display device 105. However, I prefer to take the digital information in the computer 67, operate on it in the computer, or in a separate digital device 107, to provide a modulated digital signal that goes by route 108 to the tape transcriber 66 and the D–A converter 64. The computer digital information might correspond to the series of digital values 72′, 73′, 74′, etc., in FIGURE *7a* of function "*a*." The device 107 will modulate this digital information by first adding a constant digital number 109 to each of the digitized values of function "*a*" in FIGURE *7a*, thus making the same function "*a*" with reference to a new base or reference value 110 instead of the original value 111 as shown in FIGURE *7b*. The magnitude of 109 must be greater than the maximum range of amplitude of function "*a*." The purpose of this step is to provide a full envelope modulation, which will be evident as this description progresses. The new set of digitized values shown in FIGURE *7b* are then modified by reversing the sign of alternate groups of digitized values. Groups can be made up of integral numbers of adjacent values, such as 1, 2, 3, etc. In FIGURE *7c*, I show adjacent values being reversed in polarity. This will give the highest frequency of modulation. If the reversed and direct groups comprise two or more discrete adjacent values, the modulation frequency will be one-half of that shown in FIGURE *7c*. Decision on this point depends on the frequency spectrum of function "*a*."

Figures 6, 7, 7A, 7B, 7C, 7D, 9:
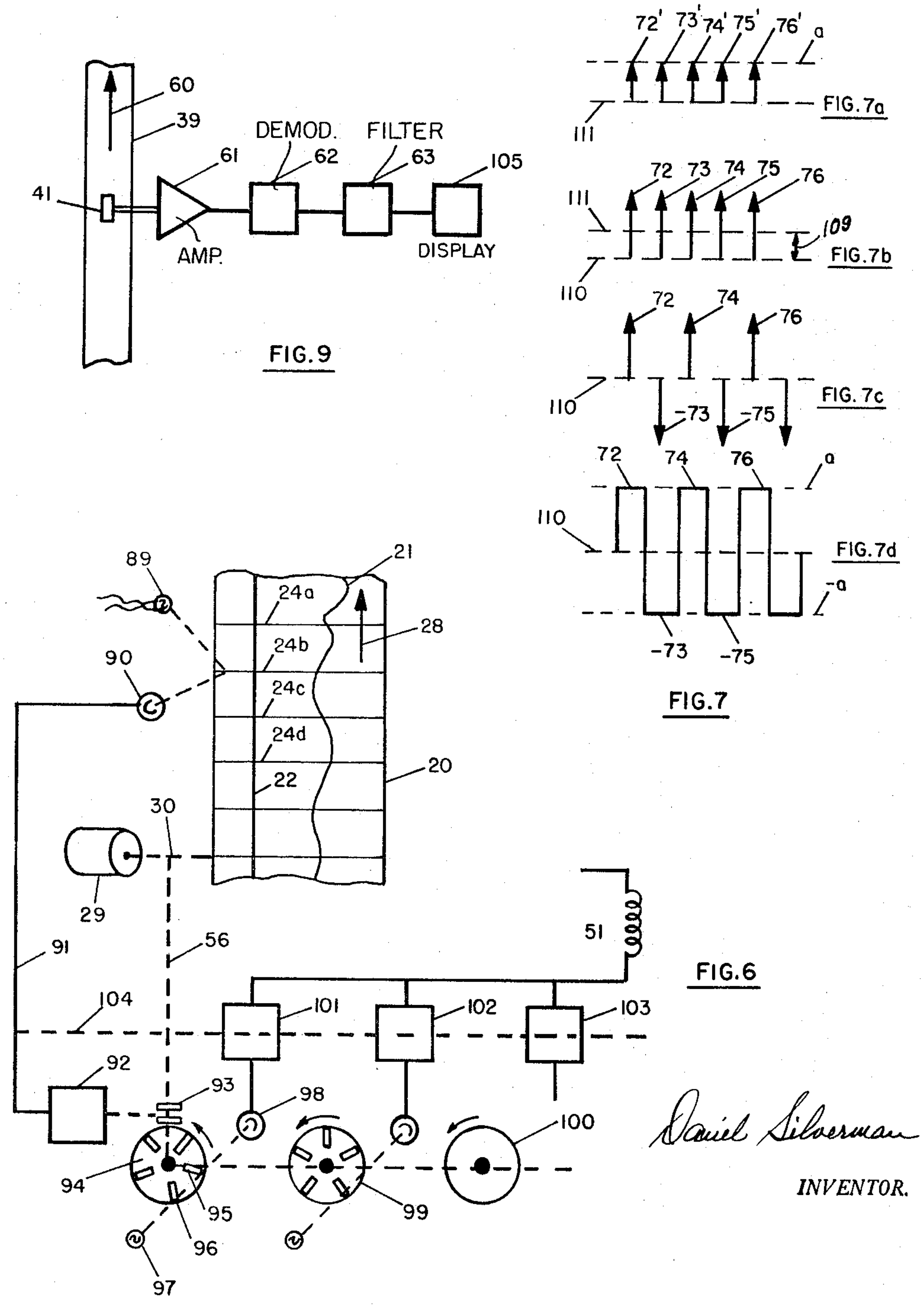
FIGURE 6 shows a more detailed schematic view of one part of the scanning device concerned with timing of the signal modulation step.
FIGURE 7 represents schematically the successive forms of the signal as it passes through the digital-to-analog conversion system, and, FIGURES 8 and 9 together represent schematically the digital-to-analog conversion system.

This digital signal of FIGURE *7c* goes by tape 108 to the tape playback 66 and to D–A converter 64. This device then provides the modulated analog signal of FIGURE *7d*. This modulated analog signal is amplified by 61 and is applied by recording head 41 to tape 39. This produces a magnetized tape similar to that provided by the signal of FIGURE *5a* coming from the record scanner. In playback from this temporary storage, as shown in FIGURE 9, the head pickup signal from 41 is amplified by 61, demodulated or detected (rectified) by 62 and filtered by 63. This corresponds to the functions shown in FIGURE 5. The signal from 61 corresponds to FIGURE *5b*; after demodulation by 62, to the function in FIGURE *5ba*; and after filtering by 63, to the function "*a*" of FIGURE *5bb*. This signal is the demodulated analog signal, and goes to the display device 105. By making the tape 39 long enough or wide enough, a large number of separate functions can be stored on the tape and then later displayed together.

While I have described and pointed out the fundamental novel features of my invention and have described it in connection with a number of modifications and embodiments, it will be understood that various changes, substitutions, additions, and omissions in the form and detail of the devices illustrated and in their operation may be made by those skilled in the art without departing from the spirit of my invention. It is therefore my intention to be limited only as indicated by the scope of the following claims, and I particularly point out and claim as my invention:

1. An information system for converting analog information in the form of a printed two dimensional curve on a record strip wherein the lateral departure of said curve from a longitudinal reference line represents an analog signal which is the stored information, into digital information, comprising:

(a) Means for transporting said record strip in a direction parallel to said reference line at a variable low speed suitable for tracing said curve, (b) Index means capable of movement in a direction substantially perpendicular to said reference line so as to trace said curve while said strip is being transported longitudinally, (c) means for generating a constant amplitude carrier signal, the period of which is a function of the rate of transport of said strip, (c′) means to amplitude modulate said carrier signal as a function of the analog signal traced by said index means, whereby an amplitude modulated analog electrical signal is provided which is a function of said departure of said curve, (d) Intermediate storage means cooperating with said transport means for recording in reproducible form said amplitude modulated analog electrical signals, at the variable low speed of transport of said strip, (e) Reproducer means cooperating with said storage means for reproducing said recorded information at high speed in the form of amplitude modulated analog electrical signals, and (f) High speed digitizing means for converting said amplitude modulated analog electrical signals to digital electrical signals.

2. An information system as in claim 1 in which said means for generating a constant amplitude carrier signal comprises a resistance network and means to apply an alternating D.-C. potential of constant amplitude to the terminals of said network.

3. An information system as in claim 2 which the alternations of said D.-C. potential are controlled by the movement of said strip.

4. An information system as in claim 1, in which said high speed digitizing means comprises means for digitzing said amplitude said modulated signals at the positive and negative peaks of said modulated signals and means for reversing the sign of the digitized values of said negative peaks.

5. In an information system in which an analog signal function is recorded as a curve on a record strip, on which longitudinal reference lines are drawn, and across which transverse indicia are drawn, including means to transport said strip past a stationary index, index means to trace said curve and means to generate an analog signal which is a unidirectional function of the departure of said curve from said reference line, the improvement comprising: means to generate an amplitude modulated signal in accordance with said analog signal function, said means comprising means to generate pulses at intervals which are simple fractions of the intervals between transit of said transverse indicia past said stationary index means to generate an electrical analog signal in accordance with the motion of said index and means to reverse the polarity of said electrical analog signal in synchronism with said pulses.

6. An information system as in claim 5 in which said means to generate said pulses comprises a photoelectric system driven in association with the transport of said strip.

7. Information transcribing apparatus for transcribing information on a record web in the form of a two-dimensional curve, the information recorded being the displacement, X, of the curve with respect to a longitudinal index, Y, perpendicular to X, the record having transverse indicia representing units of the dimension Y of the magnitude $Y_1$, comprising:

(a) Means to traverse said web in the longitudinal direction Y at a low variable speed, (b) Stationary index means for determining the displacement of said web in the direction Y, (c) Transverse index means adapted to move in the direction X perpendicular to Y for tracing said curve, (d) Means responsive to the motion of said transverse index for generating a unidirectional analog electrical signal proportional to the displacement of said curve with respect to said longitudinal index Y, and (e) Switch means responsive to the passage past said stationary index means of said transverse indicia for reversing the polarity of said analog electrical signal in synchronism with said passage of said indicia.

8. The information transcribing apparatus as in claim 7 including means for operating said reversing switch means at times corresponding to the passage past said index means of units of Y of the magnitude of $Y_2$, where $Y_2$ is a simple fraction of $Y_1$, and means to synchronize said switch means with the passage of said indicia.

9. In an information system in which analog information in the form of a printed curve on a longitudinally moving web is traced by an index system adapted to move transversely to the movement of said web, the movement of said index producing analog signals which are converted to digital form, the improvement comprising:

(a) Modulation means responsive to said index means for converting a function of the position of said index with respect to a reference position into amplitude modulated analog information, (b) Means to control the frequency of said modulation as a function of the longitudinal dimensions of the said printed curve and the speed of movement of said strip.

(c) Intermediate storage means responsive to said modulation means for recording at a speed proportional to the slow variable tracing speed of said amplitude modulated analog information, (d) Playback means for reproducing at variable high speed said recorded analog information in the form of amplitude modulated analog electrical signals, and, (e) High speed means for converting said amplitude modulated analog electrical signals to digital form.

10. An information system as in claim 9 in which said intermediate storage means comprises magnetic recording means.

11. An information system as in claim 9 in which said intermediate storage means comprises photographic recording means.

12. An information system as in claim 1 in which said high speed means for converting said amplitude modulated electrical signals to digital form includes means to digitize said analog electrical signals before demodulation.

13. An information system as in claim 1 in which said high speed means includes means to demodulate said amplitude modulated analog electrical signals and means to digitize said analog electrical signals after demodulation.

14. An information system as in claim 1 in which said means for converting said motion of said index means into amplitude modulated analog electrical signals includes means to generate an analog electrical signal which is a function of the position of said index and means to periodically bring said analog electrical signals to zero value.

15. The information system of claim 2 in which said means to modulate said carrier signal comprise potentiometer means which form part of said resistance network and drive means from said index means to said potentiometer means, whereby the output of said potentiometer means is an amplitude modulated analog electrical signal which is a function of the motion of said index means.

16. The information system of claim 3 including means for periodically synchronizing said alternations with the movement of said strip.

17. The information system as in claim 1 including signal demodulation means connected between the output of said reproducer means and the input to said digitizing means, whereby the reproduced amplitude modulated analog electrical signal is converted to a simple analog electrical signal which is then digitized.

18. The information system as in claim 6 including means to synchronize said pulses periodically with the transit of said transverse indicia past said stationary index.

References Cited by the Examiner

UNITED STATES PATENTS

| | | | |
|---|---|---|---|
| 2,378,388 | 6/1945 | Begun | 340—174.16 |
| 2,875,389 | 2/1959 | Morrill et al. | 235—61 |

(Other references on following page)

UNITED STATES PATENTS

| | | | |
|---|---|---|---|
| 2,970,309 | 1/1961 | Towles | 340—347 |
| 3,014,650 | 12/1961 | Skelton et al. | 235—61.6 |
| 3,033,447 | 5/1962 | Buegler et al. | 235—61.6 |
| 3,134,957 | 5/1964 | Foote et al. | 340—206 |
| 3,198,949 | 8/1965 | Holdo | 250—202 |
| 3,198,950 | 8/1965 | Moseley | 250—202 |

FOREIGN PATENTS

| | | |
|---|---|---|
| 812,605 | 4/1959 | Great Britain. |

MAYNARD R. WILBUR, *Primary Examiner.*

DARYL W. COOK, MALCOLM A. MORRISON, *Examiners.*

K. R. STEVENS, W. J. KOPACZ, *Assistant Examiners.*